(12) United States Patent
Frank

(10) Patent No.: US 6,198,396 B1
(45) Date of Patent: *Mar. 6, 2001

(54) MOTION SENSOR

(75) Inventor: Peter A. Frank, London (GB)

(73) Assignee: Mine Safety Appliances Company, Pittsburgh, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,229

(22) Filed: Nov. 30, 1998

Related U.S. Application Data

(60) Provisional application No. 60/099,984, filed on Sep. 11, 1998.

(51) Int. Cl.$^7$ .................................................. G08B 23/00
(52) U.S. Cl. ............................... 340/573.1; 340/686.1; 340/689; 200/61.45 R
(58) Field of Search ................ 340/573.1, 309.15, 340/540, 686.1, 686.4, 687, 689, 529; 200/61.52, 51.09, 61.71, 239, 240, 275, 277, 279, DIG. 29, 61.45 R

(56) References Cited

U.S. PATENT DOCUMENTS

| | | | |
|---|---|---|---|
| 3,831,163 | 8/1974 | Byers | 340/689 |
| 4,196,429 * | 4/1980 | Davis | 340/669 |
| 4,297,683 | 10/1981 | Roberts | 340/539 |
| 4,688,025 * | 8/1987 | Frank | 340/571 |
| 4,884,067 * | 11/1989 | Nordholm et al. | 340/686 |
| 4,978,946 * | 12/1990 | Nordholm et al. | 340/573 |
| 5,025,246 | 6/1991 | Schenkel | 340/572 |
| 5,332,876 * | 7/1994 | Romano et al. | 200/61.52 |

FOREIGN PATENT DOCUMENTS

| | | |
|---|---|---|
| 609 839 | 8/1926 | (FR) . |
| 2 535 060 | 4/1984 | (FR) . |

* cited by examiner

*Primary Examiner*—Daniel J. Wu
*Assistant Examiner*—Toan Pham
(74) *Attorney, Agent, or Firm*—James G. Uber; Henry E. Bartony, Jr.

(57) ABSTRACT

A motion sensor having an electrically-conductive ball and at least a second ball to damp the motion of the electrically-conductive ball. Both balls are confined within a housing. A plurality of electrical contact elements are disposed within the housing. During movement, the electrically-conductive ball successively forms electrical connection with the electrical contact elements within the housing. The motion sensor also includes detection circuitry in electrical connection with the electrical contact elements to detect if the electrically-conducting ball is moving.

20 Claims, 3 Drawing Sheets

MOTION SENSOR

This application claims benefit to U.S. provisional application Ser. No. 60/099,984, filed Sep. 11, 1998.

FIELD OF THE INVENTION

The present invention relates to a motion sensor, and, more particularly, to a motion sensor used to detect whether an object or body to which the motion sensor is attached has become motionless.

BACKGROUND OF THE INVENTION

A number of motion sensors incorporating a ball within a housing have been developed over the years. For example, U.S. Pat. Nos. 3,742,478 and 4,196,429 describe motion sensors in which an electrically-conductive ball is confined for movement within a generally cylindrical container. On an inner surface of the container (either on the cylindrical side wall or on one or both of the end walls), two sets of elongated contacts are formed, the contacts of each set being interspaced or interlaced with those of the other set. The ball is able to bridge an adjacent pair of contacts to form an electrical connection between the two sets. As the device is moved, the ball rolls over the contacts, successively making and breaking connections between the two sets. This motion is detected by a circuit coupled to the contacts, and an alarm is then sounded.

The designs of U.S. Pat. Nos. 3,742,478 and 4,196,429 have a number of drawbacks. For example, a false alarm can arise from slight vibrations. A third set of contacts introduced to solve this problem in one embodiment of U.S. Pat. No. 3,742,478 results in a complicated electrode arrangement and makes the sensitivity of the device dependent upon the position of the ball prior to movement. Moreover, because the measuring circuit of those designs rely upon the ball thereof bridging adjacent contacts, the contacts have to be raised above the surface upon which the ball rolls. The movement of the ball and, accordingly, the sensitivity of the motion sensor is thus impeded. Furthermore, the elevated contacts result in a tendency of the ball to ride along between contacts rather than over the upper surfaces thereof, thereby preventing the alarm from sounding.

An improved motion sensor is described in U.S. Pat. No. 4,688,025, the disclosure of which is incorporated herein by reference. In one embodiment, that sensor comprises a ball confined within a cylindrical housing. The cylindrical housing comprises a side wall carrying a first set of electrical contacts and a second set of electrical contacts and an end wall carrying terminal means. The contacts of the side wall are preferably formed flush with the inner circumference of the side wall. During movement, the ball successively electrically connects the first set and the second of contacts with the terminal means. The sensor of U.S. Pat. No. 4,688,025 further includes a circuit for producing an alarm signal in response to detecting such successive connections.

Not only is the sensor of U.S. Pat. No. 4,688,025 well designed for the detection of motion, it also finds an important use as a detector for lack of motion. In that regard, the motion sensor of U.S. Pat. No. 4,688,025 is used in the FireFly® Personal Alert Safety Systems (PASS) available from Mine Safety Appliances Company of Pittsburgh, Pa. See, for example, Mine Safety Appliances Company Bulletin Nos. 0119-19, 0119-07, and 0119-06, as well as Mine Safety Appliances Company Data Sheet 01-00-22, the disclosures of which are incorporated herein by reference. The motion sensor of these PASS devices cause both audible and visual alarms to be activated if movement by a person wearing the PASS device ceases for a predetermined period of time. Likewise, U.S. Pat. No. 5,781,118, the disclosure of which is incorporated herein by reference, discloses a self-contained breathing apparatus having a PASS device wherein the motion sensor of U.S. Pat. No. 4,688,025 is integrated therewith.

PASS devices as described above are used, for example, as a safety device by firemen who may be overcome by smoke or toxic fumes while fighting a fire. Should such a fireman be overcome and cease movement, the PASS device provides an alarm to others so that a rescue can be effected. Recently, revisions to the National Fire Protection Association ("NFPA") Standard for PASS devices (NFPA 1982, 1998 Edition) were approved. As part of these revisions, the timing requirements for the detection of lack of motion are to be changed. In that regard, PASS devices will have to meet a tighter timing tolerance for the alarm.

It is thus very desirable to develop motion sensors that will meet and exceed the timing requirements of the NFPA Standard for PASS devices.

SUMMARY OF THE INVENTION

Generally, the present invention provides a motion sensor comprising: a first ball which is electrically conductive; at least one additional ball which preferably is not electrically conductive and which damps the motion of the electrically-conductive ball; a housing to confine the movement of the first ball and the additional balls; a plurality of electrical contact elements within the housing, the electrically-conductive ball being capable, during movement within the housing, of successively, forming electrical connection with the electrical contact elements within the housing; and detection circuitry in electrical connection with the electrical contact elements to detect if the electrically-conducting ball is moving.

Preferably, the housing comprises a substantially cylindrical structure having a side wall and at least a first end wall. The electrical contact elements preferably comprise a first set of electrical contact elements and a second set of electrical contact elements disposed on the side wall. The electrical contact elements are preferably spaced around the inner circumference of the structure with the electrical contact elements of the first set interlaced or interspaced with the electrical contact elements of the second set.

The motion sensor preferably further comprises a first terminal carried by the end wall. During motion of the electrically-conductive ball, it successively electrically connects the electrical contact elements of the first set and the second set with the first terminal. The motion sensor preferably further comprises an alarm signal generating circuit coupled to the electrical contact elements and to the terminal to produce an alarm signal in response to lack of motion of the electrically-conductive ball.

The additional ball or balls are preferably formed from a nonconductive material such as nylon and act to damp the motion of the electrically-conductive ball and thereby decrease the settling time without substantially decreasing the sensitivity of the motion sensor to movement by the object or person to which the motion sensor is attached. Alternatively they could be conductive balls which are covered with an electrically-nonconductive material such as teflon or plastic.

It has been discovered that by damping the motion of the electrically-conductive ball with at least a second ball within the housing of the motion sensor, the electrically-conductive ball comes to rest more quickly and consistently after motion of the object or person to which the motion sensor is attached ceases moving. This result is very desirable, for example, in a motion sensor used in connection with PASS devices. In such devices, it is desirable to activate an alarm within a specified time interval after movement of the person wearing the device stops. Too much damping, however, will adversely affect the sensitivity of the device which will result in more false alarms.

Other details, objects and advantages of the present invention will be readily apparent from the following detailed description of the invention.

BRIEF DESCRIPTION OF THE DRAWINGS

In the accompanying drawings, the present invention is illustrated, by way of example only, wherein.

DETAILED DESCRIPTION OF THE INVENTION

Figure 1:
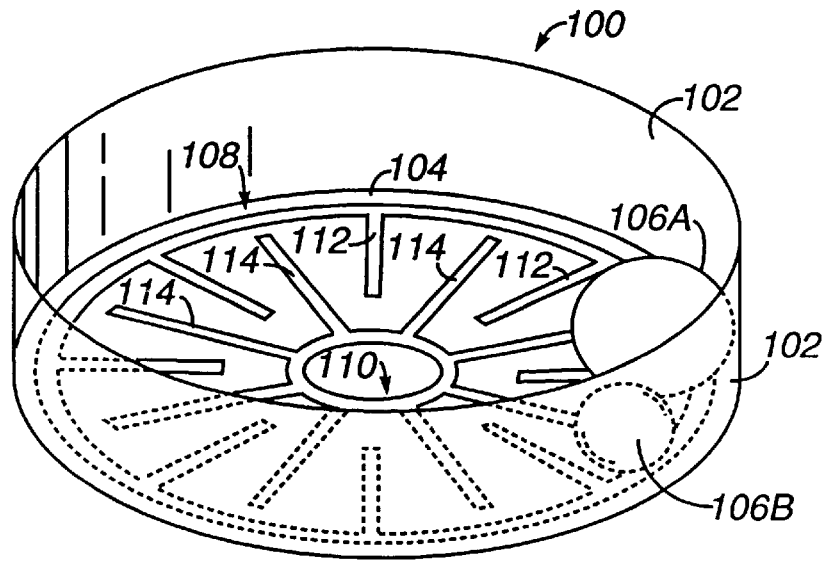
FIG. 1 shows one embodiment of a motion sensor of the present invention having two balls.
Figure 2:
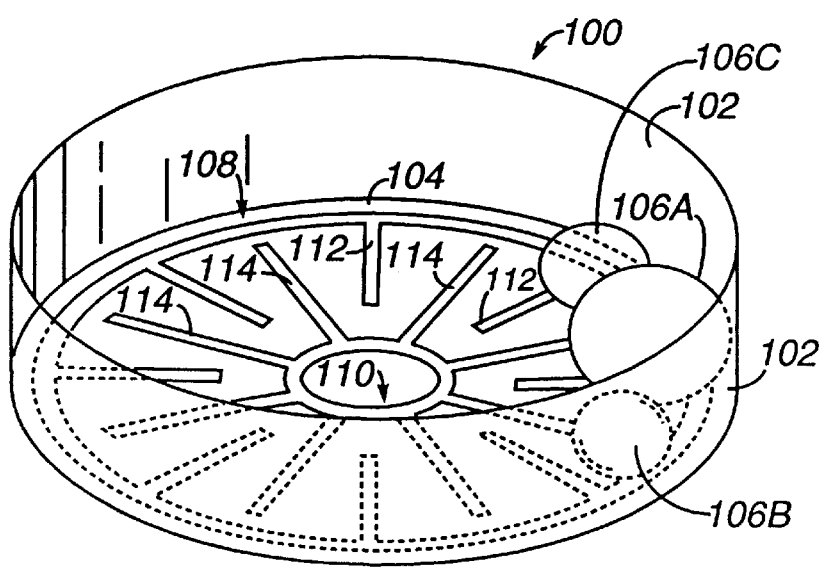
FIG. 2 shows the embodiment of FIG. 1 having more than two balls.

FIGS. 1 and 2 illustrate one embodiment of the present invention in which a motion or movement sensor 100 comprises a cylindrical container having a side wall 102 and two end walls 104 (only one of which is shown in FIGS. 1 and 2 for the purposes of clarity). The closed container houses a ball 106A made of an electrically-conductive material, such as a metal ball-bearing. Preferably ball 106A is a non-corrosive beryllium or phosphor bronze ball bearing. Ball 106A preferably has a diameter slightly less than the height of the container.

Side wall 102 is preferably made of conductive material, or alternatively has a conductive layer on its inner surface. Each of end walls 104 preferably has on its inner surface electrically-conductive regions 108 and 110. Region 108 preferably has the shape of a ring with a plurality of radially inwardly extending contact arms 112. Region 110 is preferably shaped as an inner ring having a plurality of radially outwardly extending contact arms 114 which are interlaced or interspaced with arms 112. Regions 108 and 110 can be formed by any of the known methods for forming printed circuit boards, for example, etching, or preferably by using printed conductive ink. It is desirable that the regions do not impede movement of ball 106A, and for this reason they are preferably substantially flush with the inner surface of end wall 104.

In almost any orientation of sensor 100, ball 106A will rest with one part of its surface contacting side wall 102, and another part touching either one of arms 112 or 114, or the space between a pair of such arms. Even if ball 106A is not already in such a position, slight movement of sensor 100 will cause it to adopt such a position. If desired, one or both end walls 104 and/or side wall 102 can extend inwardly in its mid-region to encourage or guarantee the adoption of this position. Indeed, by inwardly doming end walls 104 it is possible to arrange for ball 106A to be confined so that it can only run around the inner rim of the cylinder. Thereafter, movement of sensor 100 will cause the ball to roll, while maintaining contact with side wall 102, so that ball 106A successively touches respective arms 112 and 114.

Like the motion sensor of U.S. Pat. No. 4,688,025, sensor 100 operates in any plane. Whatever the initial orientation of sensor 100, the neutral equilibrium of ball 106A and its tendency to roll within the container while maintaining two points of contact will ensure that ball 106A electrically connects side wall 102 with, successively, contact arms 112 and 114 formed on one or other of end walls 104. If, for example, sensor 100 is moved while end walls 104 are horizontal, ball 106A will tend to roll around the rim. If, as another example, sensor 100 is moved while end walls 104 are vertical, ball 106A will tend to rock on the lowermost part of the inner surface of side wall 102.

Figure 3:
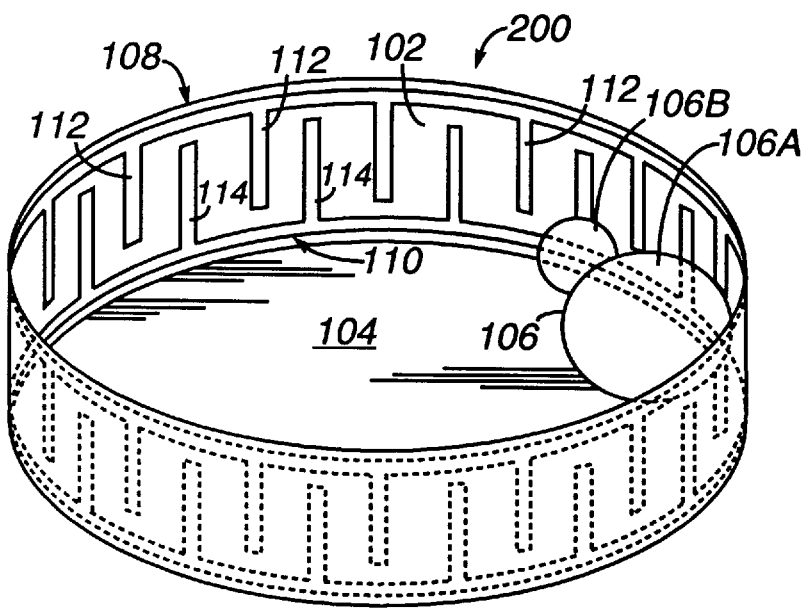
FIG. 3 shows another embodiment of a motion sensor of the present invention having two balls.
Figure 4:
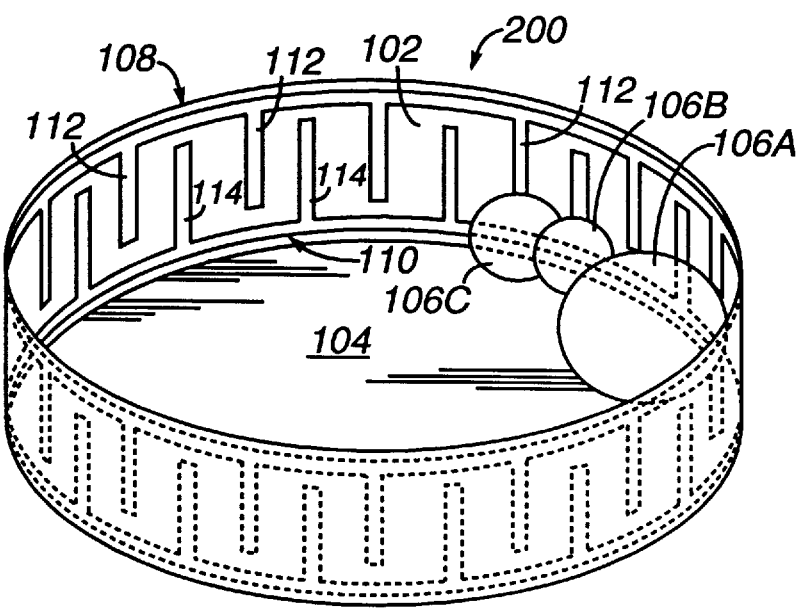
FIG. 4 shows the embodiment of FIG. 3 having more than two balls.

Referring to FIGS. 3 and 4, a sensor 200 is illustrated that is very similar to that of FIGS. 1 and 2 except that, in the case of sensor 200, regions 108 and 110 are formed on the inner surface of side wall 102, with interspaced contact arms 112 and 114 extending in the direction of the height of the cylindrical container. The inner surfaces of the end walls 104 are preferably electrically conductive and electrically connected together. They preferably form a common terminal that can be successively connected to arms 112 and 114 by the movement of the ball 106A. The arrangement of FIGS. 3 and 4 has the advantage that, for a given minimum spacing between arms 112 and 114, a greater number of these arms can be provided than in the arrangement of FIG. 2, thereby providing greater sensitivity to motion.

In all of the embodiments described in FIGS. 1–4 it is possible to form conductive regions 108 and 110 on a substrate which is then attached to an inner surface of the cylindrical container.

Unlike prior motion sensors, sensors 100 and 200 preferably further comprise at least one second ball 106B and even a third ball 106C. Second ball 106B and third ball 106C are preferably fabricated from a nonconductive material such as nylon so that the electrical connections formed by electrically-conductive ball 106A during motion thereof as described above are unaffected by balls 106B and 106C. Balls 106B and/or 106C could be fabricated from a conductive material if an appropriate geometric configuration is used wherein the balls do not touch both sets of electrical contacts simultaneously, but such an embodiment may undesirably require increased complexity of the positioning of electrical contacts within the container. Alternatively these conductive balls could be coated with a layer of nonconductive material such as teflon or plastic.

It has been discovered that inclusion of a second ball 106B and even a third ball 106C acts to significantly damp the motion of electrically-conductive ball 106A within the container without substantially affecting the sensitivity of the sensor to motion. It is believed that this damping effect is predominantly a result of frictional forces between balls 106A and 106B and 106C. The damping effect can be controlled by appropriate selection of the number, size and material of the additional balls. Preferably balls 106B and 106C have a diameter which is about one-half that of ball 106A. The appropriate size and material for balls 106B and 106C will depend upon the size and mass of ball 106A, the number of additional balls, and the required timing tolerance or desired settling time (i.e., the time allowed/required for the motion sensor to determine that no motion has occurred and to begin its pre-alarm sequence. Care must be taken, however, not to increase the damping too much as this will adversely affect the sensitivity of the motion sensor. The variation in the settling time of the present invention is preferably less than approximately five (5) seconds.

Figure 5:
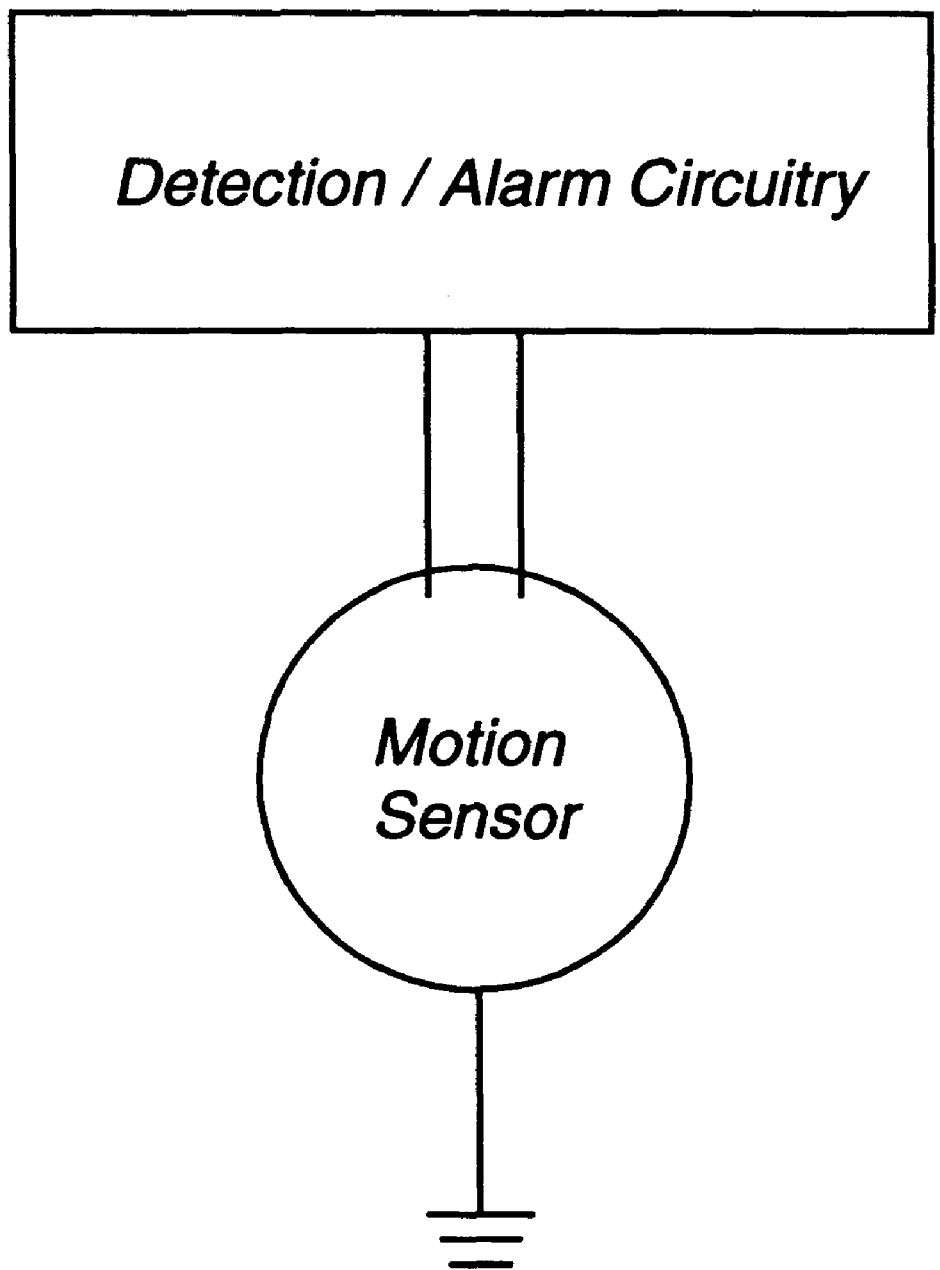
FIG. 5 illustrates schematically an embodiment of a safety device incorporating a motion sensor of the present invention.

As illustrated in FIG. 5, the motion sensor of the present invention is preferably in operative connection with detection and alarm circuitry. Examples of detection and alarm circuitry suitable for use in connection with the motion sensor of the present invention are disclosed in U.S. Pat. Nos. 4,688,025 and 5,781,118.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A movement sensor for detecting motion in any direction comprising:
   a first ball which is electrically conductive;
   a second ball to damp the motion of the electrically-conductive ball without substantially affecting the sensitivity of the movement sensor to motion in any direction;
   a housing to confine the movement of the first ball and the second ball;
   a plurality of electrical contact elements within the housing, the electrically-conductive ball being capable, during movement within the housing, of successively, forming electrical connection with the electrical contact elements within the housing regardless of the orientation of the housing;
   detection circuitry in electrical connection with the electrical contact elements to detect if the electrically-conducting ball is moving.

2. The motion sensor of claim 1 wherein the second ball is formed from an electrically-nonconductive material.

3. The motion sensor of claim 2 wherein the housing comprises a substantially cylindrical structure, the structure comprising a side wall and a first end wall.

4. The motion sensor of claim 3 wherein the electrical contact elements comprise a first set of electrical contact elements and a second set of electrical contact elements disposed on the side wall, the electrical contact elements being spaced around an inner circumference of the structure with the electrical contact elements of the first set interspaced with the electrical contact elements of the second set.

5. The motion sensor of claim 4, further comprising a first terminal carried by the end wall, the electrically-conductive ball being capable, during movement within the structure, of successively, electrically connecting the electrical contact elements of the first set and the second set with the first terminal.

6. The motion sensor of claim 5, further comprising an alarm signal generating circuit coupled to the electrical contact elements and to the terminal to produce an alarm signal in response to lack of motion of the electrically-conductive ball.

7. The motion sensor of claim 6 wherein the variation in the settling time for the balls is less than approximately five seconds.

8. The motion sensor of claim 1 wherein the electrically-conductive ball is made from a noncorrosive material.

9. The motion sensor of claim 1 wherein the second ball has an outer layer formed from an electrically-nonconductive material.

10. The motion sensor of claim 1 wherein the variation in the settling time for the balls is less than approximately five seconds.

11. A movement sensor for detecting motion in any direction comprising:
    a first ball which is electrically-conductive;
    a plurality of additional balls to damp the motion of the electrically-conductive ball without substantially affecting the sensitivity of the movement sensor to motion in any direction;
    a plurality of electrical contact elements within a housing, the electrically-conductive ball being capable, during movement within the housing, of successively forming electrical connection with the electrical contact elements within the housing regardless of the orientation of the housing;
    detection circuitry in electrical connection with the electrical contact elements to detect if the electrically-conducting ball is moving.

12. The motion sensor of claim 11 wherein the plurality of additional balls are formed from an electrically-nonconductive material.

13. The motion sensor of claim 12 wherein the housing comprises a substantially cylindrical structure, the structure comprising a side wall and a first end wall.

14. The motion sensor of claim 13 wherein the electrical contact elements comprise a first set of electrical contact elements and a second set of electrical contact elements disposed on the side wall, the electrical contact elements being spaced around an inner circumference of the structure with the electrical contact elements of the first set interspaced with the electrical contact elements of the second set.

15. The motion sensor of claim 14, further comprising a first terminal carried by the end wall, the electrically-conductive ball being capable, during movement within the structure, of successively, electrically connecting the electrical contact elements of the first set and the second set with the first terminal.

16. The motion sensor of claim 15, further comprising an alarm signal generating circuit coupled to the electrical contact elements and to the terminal to produce an alarm signal in response to lack of motion of the electrically-conductive ball.

17. The motion sensor of claim 16 wherein the variation in the settling time for the balls is less than approximately five seconds.

18. The motion sensor of claim 11 wherein the electrically-conductive ball is made from a noncorrosive material.

19. The motion sensor of claim 11 wherein the plurality of additional balls have an outer layer formed from an electrically-nonconductive material.

20. The motion sensor of claim 11 wherein the variation in the settling time for the balls is less than approximately five seconds.

* * * * *